A. M. DEMUTH.
COOKER.
APPLICATION FILED AUG. 21, 1916. RENEWED NOV. 26, 1917.

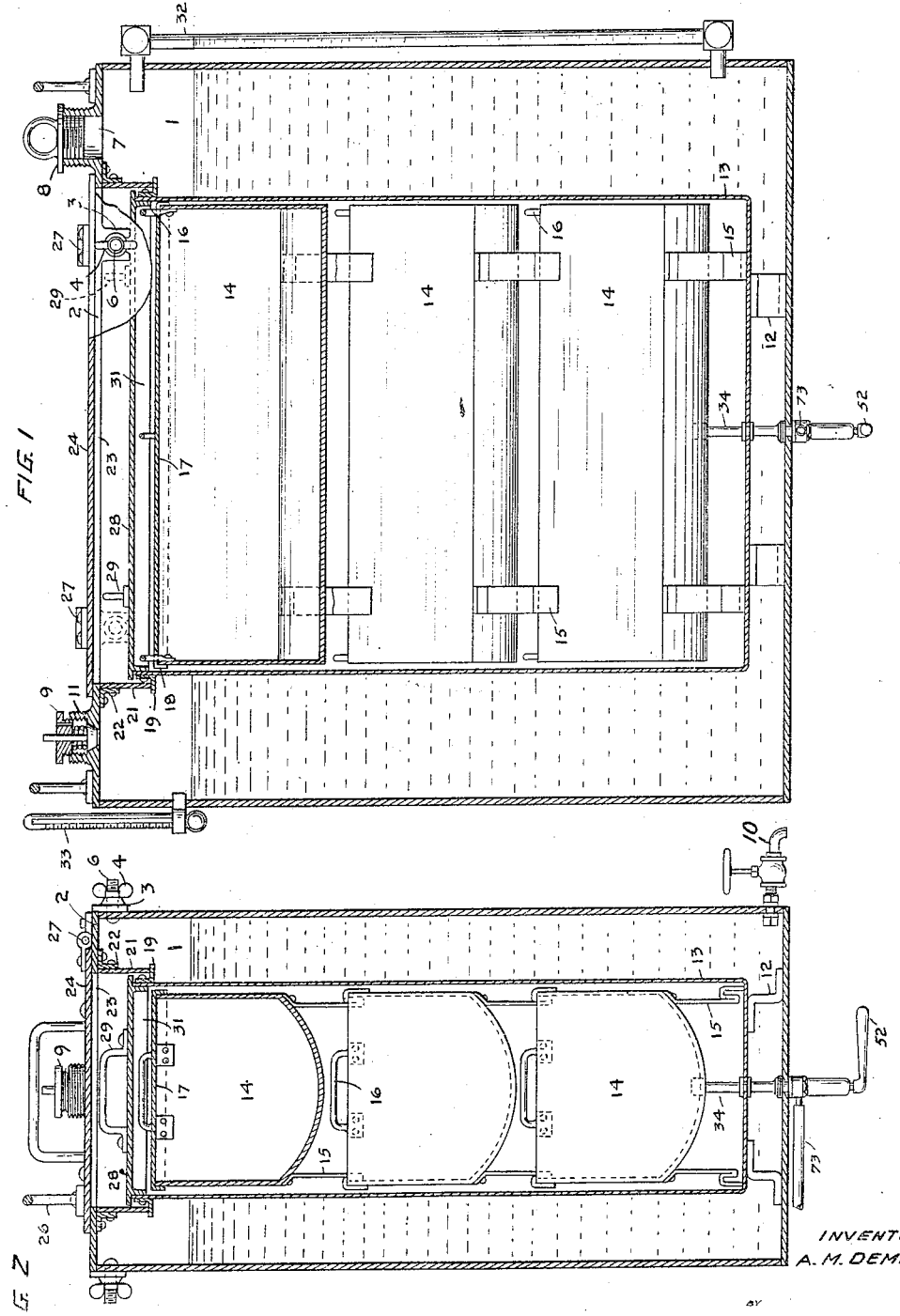

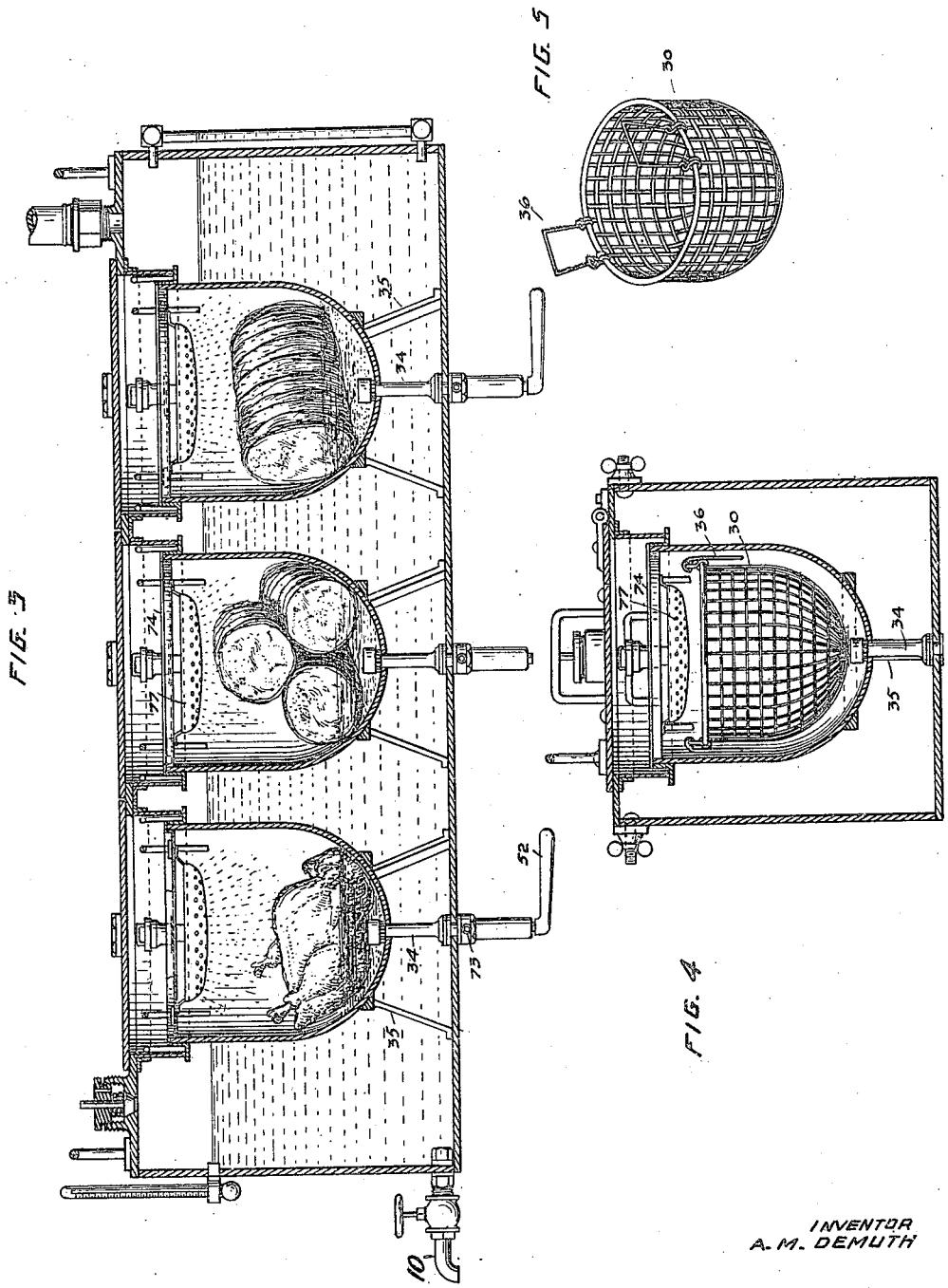

1,258,995.

Patented Mar. 12, 1918.
4 SHEETS—SHEET 3.

INVENTOR
A. M. DEMUTH

BY
F. M. Wright
ATTY.

A. M. DEMUTH.
COOKER.
APPLICATION FILED AUG. 21, 1916. RENEWED NOV. 26, 1917.
1,258,995.
Patented Mar. 12, 1918.
4 SHEETS—SHEET 4.
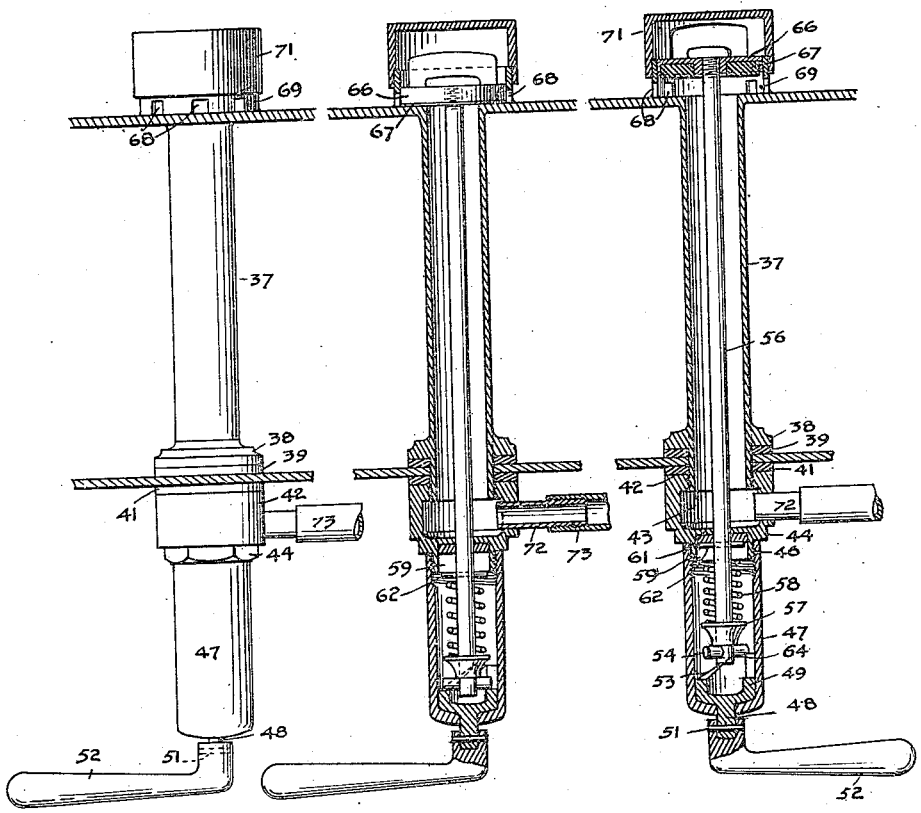
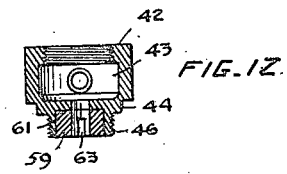
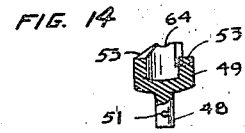
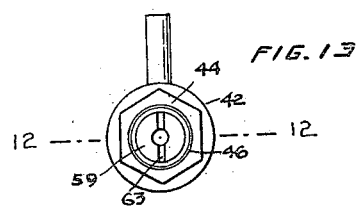
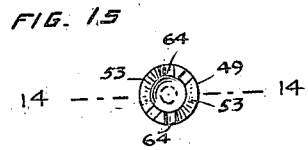
INVENTOR
A. M. DEMUTH
by
F. M. Wright
ATTY.

UNITED STATES PATENT OFFICE.

ALFRED M. DEMUTH, OF SAN FRANCISCO, CALIFORNIA.

COOKER.

1,258,995. Specification of Letters Patent. Patented Mar. 12, 1918.

Application filed August 21, 1916, Serial No. 115,975. Renewed November 26, 1917. Serial No. 204,101.

*To all whom it may concern:*

Be it known that I, ALFRED M. DEMUTH, a citizen of the United States, residing at San Francisco, in the county of San Francisco and State of California, have invented new and useful Improvements in Cookers, of which the following is a specification.

The present invention relates to improvements in vessels for cooking meats, vegetables, fruits and the like.

One object of the invention is to provide such a vessel by which these can be cooked by the heat of boiling or hot water, without the condensation therefrom coming in contact with the food being cooked, so that said food is cooked entirely in its own juices and at a uniform and moderate temperature. A further object is to provide a cooker of this character in which meats and vegetables of different kinds can be cooked simultaneously. A further object is to provide such a cooker from which the juices can be withdrawn from time to time and distributed slowly and regularly over the meat being cooked, so as to moisten or baste the same.

Figure 6:
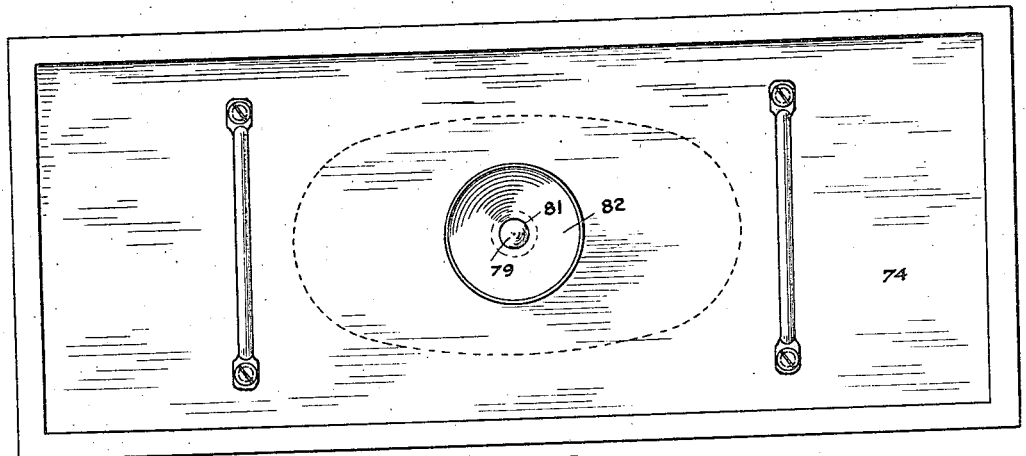
Figure 7:
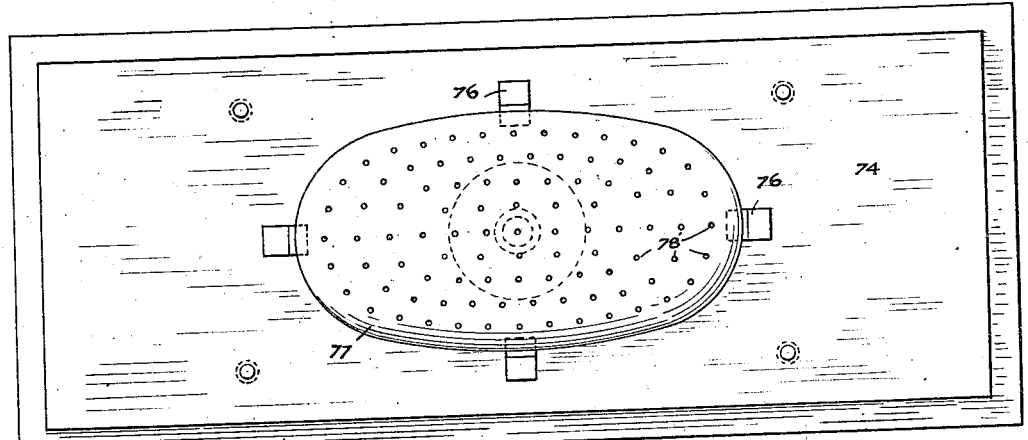
Figure 8:
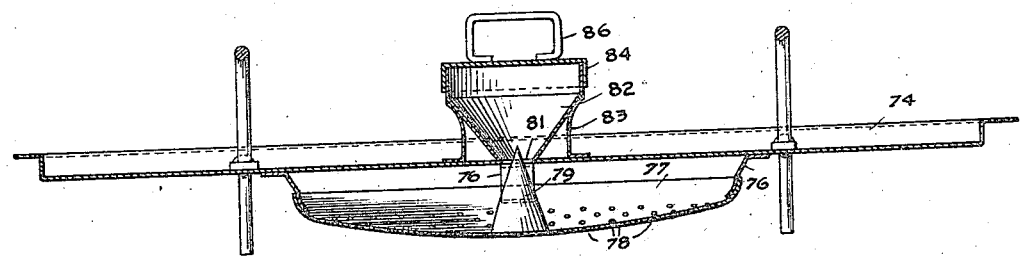

In the accompanying drawings, Figure 1 is a longitudinal vertical section, parts being shown in side elevation, of one form of my improved cooker; Fig. 2 is a transverse section thereof; Fig. 3 is a view similar to Fig. 1 of another form thereof; Fig. 4 is a transverse section of the form of the invention shown in Fig. 3; Fig. 5 is a perspective view of a basket used in my improved cooker; Fig. 6 is an enlarged top plan view of a cover for the cooker shown in Fig. 3, a cap being removed; Fig. 7 is a bottom plan view thereof; Fig. 8 is a longitudinal section thereof; Fig. 9 is an enlarged side view of a draw-off pipe; Figs. 10 and 11 are vertical sections of the same in different positions; Fig. 12 is a vertical section on the line 12—12 of Fig. 13 of a portion thereof detached; Fig. 13 is a plan view thereof; Fig. 14 is a broken side view, part being shown in section on the line 14—14 of Fig. 15, of another portion thereof detached; Fig. 15 is a plan view thereof.

Referring to the drawings, 1 indicates a boiler having a top 2, formed with depending ears 3, adapted to be clamped by thumb nuts 4 to screws 6 projecting outwardly from the sides of the boiler 1 near its top. The boiler 1 is supplied with water by an opening 7 through the top closed by a screw plug 8, and the steam can escape through a safety valve 9. The water is drawn off from the bottom by a faucet 10.

The casing of the safety valve is threaded on the outside, as shown at 11, so that, if desired, instead of using the valve, such casing can be connected to one end of a pipe, by which the steam from the boiler can be conducted to any place desired.

Supported by legs 12 on the bottom of the boiler is a cooker 13, of a form suited to contain a vertical series of cooking vessels 14, each supported by legs 15, lower portions of which are formed to rest either upon the bottom of the cooker or on the top of the next cooking vessel below it.

Said vessels have handles 16 by which they can be lifted and the uppermost cooking vessel is closed by a lid 17 having slots 18 through which said handles can be passed. To the side wall of the cooker near the top are riveted angle irons 19 upon which rest flanges 21 secured by angle irons 22 to the top 2, and depending therefrom around a rectangular hole 23 therein, slightly larger than the cooker, and which is closed by a lid 24 having a handle 26, and hinged, as shown at 27, to the top 2 of the boiler. 28 indicates a cover for the cooker, having handles 29, and extending over the edge of the cooker and having a flange 31 depending into the cooker. 32 indicates a gage by which the height of the water in the boiler can be ascertained, and 33 indicates a thermometer for indicating the temperature.

The double cover within the boiler is of great value in preventing the escape of heat from the cooking vessel.

From the bottom of the lowermost vessel 14 extends through the bottom of the cooker and the bottom of the boiler an outlet conduit 34, the construction of which will be hereinafter more particularly described.

In the form of the invention shown in Figs. 3 and 4 the boiler is of a form convenient for containing a horizontal series of cooking vessels, each of which is supported by legs 35 on the bottom of the boiler, there being in this form of the invention no intermediate cooker. The draw-off conduits extend from the bottoms of the cooking vessels only through the bottom of the boiler.

In Figs. 4 and 5 is shown an open-bodied container 30 for containing meats, ears of corn, potatoes or other edibles in sufficiently large pieces. Said container has collapsible handles 36, by which it can be raised with its contents from the cooking vessel.

As clearly shown in Figs. 9 to 15, each draw-off conduit comprises a tube 37 depending from the bottom of the cooking vessel around a hole therein, and extending through a hole in the bottom of the boiler, being threaded at its lower end below said bottom, and having a flange 38 above said bottom. Between said flange and the bottom of the boiler is interposed a gasket 39, a gasket 41 being also interposed between the bottom of the boiler and a cylindrical wall 42 of a chamber 43, the upper end of which wall is screwed on the threaded lower end of the tube 37. Said wall is formed with a hexagonal portion 44 and a reduced threaded portion 46, around which is screwed the upper end of a cylindrical casing 47 having a closed lower end, through a central opening in which extends a stem 48 depending from a crown cam 49 within the casing 47. Said stem is secured by a pin 51 to a handle 52 by which it may be turned. Said crown cam has two cam surfaces 53, which engage opposite ends of a pin 54 extending horizontally through a hole in the lower end of a stem 56. Around said stem is a collar 57, against which presses the lower end of a spring 58, coiled around the stem, of which the upper end presses against the lower end of a sleeve 59, which abuts against a web 61 across said chamber. A pin 62 extending through said stem can move vertically in diametrically opposite slots 63 in said sleeve, and limits the upward movement of said stem. Diametrically opposite rounded recesses 64 are formed in the crown surfaces of said cam, close to the upper end of said cam surfaces.

The upper end of said stem 56 is screwed into the center of a head 66, recessed on its under side to receive an angular gasket 67, so that, when said head is lowered, it closes openings 68 in a cylindrical wall 69 secured upon the bottom of the cooker, the top of said wall being closed by a cap 71.

A pipe 72 connects at its outer end with a pipe 73 leading to any desired point and communicates with the chamber 43.

In the normal condition of the draw-off conduit, the handle is so directed that the ends of the transverse pin rest at the bottoms of the cam surfaces, being held against said surfaces by the pressure of the compressed coiled spring 58. In this position the edge of the head 66 closes the openings through the wall 69, so that none of the juices can escape from the cooking vessel. Now, if the handle be turned through nearly a right angle, the stem 58 is raised by the cam, so that the openings are uncovered, and the juices of the food flow from the cooker through said openings 68 and the tube 37 into the chamber 43, from which it can flow by the pipes 72 and 73 to any point desired.

The draw-off conduit is useful when an excess of liquid is produced in the operation of cooking, as for instance, when cooking an unusually fat ham, but is of especial utility in the operation of moistening food or basting meat, for which purpose I make the following provision:

From the under side of the cover 74 of the cooking vessel depend short tie plates 76, the lower portions of which are secured to marginal portions of a dish-shaped distributing plate 77, formed with a large number of small perforations 78 therethrough. Upon a central portion of said distributing plate is supported a conical distributer 79, the upper end of which extends centrally through a hole 81 in the cover 74. Above the cover, and around said hole, is an inverted conical or funnel-shaped guide or receptacle 82 supported by a tube 83 upon the cover. A cap 84, having a handle 86, normally closes the top of the funnel-shaped guide.

To baste the meat the cap 84 is removed by the handle 86, and the juices of the meat are poured into the funnel-shaped guide 82, being distributed by the conical distributer on to the distributing plate and falling through the minute holes therethrough on to the meat in the cooking vessel.

By this arrangement the meat is basted continuously and the juices drip constantly upon the meat. This is much superior to the ordinary method of basting meat, in which the cook pours the gravy on to the meat from a ladle or the like, as in the latter case very little of the gravy is effective for basting the meat, and most of it runs off at the sides into the bottom of the pan. By the present arrangement it is only necessary for the cook to draw off the juices at long intervals and pour them again into the distributer 77 and the gravy then drips slowly and regularly over the meat, so that the device is, so to speak, self-basting.

Instead of allowing the water to reach the boiling point, the device may be used to cook edibles by using water at a temperature between 150° and boiling point, and exposing the edibles to this heat for a period of eight or ten hours.

However, when it is desired to hasten the cooking the water is brought to boiling point.

I claim:—

1. In a cooker, in combination with a boiler, a cooking vessel therefor, and a draw-off conduit extending from the wall of said cooking vessel through the bottom of said boiler, a stem in said conduit, a head thereon for controlling the passage of fluid into the conduit, a cam within the conduit arranged to raise said stem with a rotary movement of the latter, and means outside the boiler for turning said stem.

2. In a cooker, in combination with a boiler, a cooking vessel therefor, and a draw-off conduit extending from the wall of said cooking vessel through the bottom of said boiler, said conduit having a chamber into which liquids entering the conduit can descend, a draw-off pipe connected with said chamber, and means outside the boiler for controlling the passage of fluid through said conduit.

3. In a cooker, the combination with a boiler, a cooking vessel therefor, and a drawoff conduit extending from the bottom of said cooking vessel through the wall of said boiler, a stem in said conduit, a head thereon for controlling the passage of fluid into the conduit, means within the conduit arranged to raise said stem, and means outside of the conduit for actuating the stem.

4. In a cooker, the combination with a boiler, a cooking vessel therefor, and a draw-off conduit extending from the bottom of said cooking vessel through the wall of said boiler, a stem in said conduit, a head thereon for controlling the passage of fluid into the conduit, means within the conduit arranged to raise said stem, and means outside of the conduit for actuating the stem, the first said means embodying a cam device.

5. In a cooker the combination with a boiler, a cooking vessel therefor, and a draw off conduit extending from the bottom of said cooking vessel through the wall of said boiler, a stem in said conduit, a head thereon for controlling the passage of fluid into the conduit, yielding means tending normally to seat said head, means within the conduit adapted to raise the stem against the stress of the said yielding means, means exterior of the boiler for actuating the stem raising means to unseat said head, and cooperating means on the stem raising means and the stem for maintaining said head unseated.

6. In a cooker, the combination with a boiler, a cooking vessel therein, a draw off conduit leading from the bottom of the cooking vessel through the wall of the boiler, a perforated distributing plate in the top of the cooking vessel for distributing liquids over the contents of the cooking vessel, and a receptacle supported upon the plate for containing a supply of fluid to be supplied to the plate, said receptacle having an outlet opening discharging on to the plate.

7. In a cooker, the combination with a boiler, a cooking vessel therein, a draw off conduit leading from the bottom of the cooking vessel through the wall of the boiler, a perforated distributing plate in the top of the cooking vessel for distributing liquids over the contents of the cooking vessel, an open bottom receptacle supported above and in close proximity to the plate for containing a supply of liquid, and a conical element supported by the plate and extending into the said opening out of contact with the wall of the opening.

8. In a cooker, the combination with a boiler, a cooking vessel therein, a draw off conduit leading from the bottom of the cooking vessel through the wall of the boiler, a perforated distributing plate in the top of the cooking vessel for distributing liquids over the contents of the cooking vessel, a receptacle supported upon the plate for containing a supply of fluid to be supplied to the plate, said receptacle having an outlet opening discharging on to the plate, and a cover for the cooking vessel and by which cover the said distributing plate and receptacle are supported.

9. In a cooker, the combination with a boiler, a cooking vessel therein, a draw off conduit leading from the bottom of the cooking vessel through the wall of the boiler, a perforated distributing plate in the top of the cooking vessel for distributing liquids over the contents of the cooking vessel, a receptacle supported upon the plate for containing a supply of fluid to be supplied to the plate, said receptacle having an outlet opening discharging on to the plate, a cover for the cooking vessel and by which cover the said distributing plate and receptacle are supported, and a separate cover for the receptacle.

10. In a cooker, the combination with a boiler, a cooking vessel therein, a draw off conduit leading from the bottom of the cooking vessel through the wall of the boiler, a perforated distributing plate in the top of the cooking vessel for distributing liquids over the contents of the cooking vessel, a receptacle supported upon the plate for containing a supply of fluid to be supplied to the plate, said receptacle having an outlet opening discharging on to the plate, a cover for the cooking vessel and by which cover the said distributing plate and receptacle are supported, the said receptacle being exterior of the cooking vessel when the cover is in position on the vessel, and a separate cover for the receptacle.

ALFRED M. DEMUTH.